United States Patent
Thomas et al.

(10) Patent No.: US 10,189,373 B2
(45) Date of Patent: Jan. 29, 2019

(54) SEAT ARRANGEMENT

(71) Applicant: JOHNSON CONTROLS TECHNOLOGY COMPANY, Plymouth, MI (US)

(72) Inventors: Michael John Thomas, Ann Arbor, MI (US); Kenneth M. Clark, Howell, MI (US); Robert J. Hicks, Canton, MI (US); Eric B. Michalak, Northville, MI (US); Ganesh Sankaran, Farmington Hills, MI (US); Bernd Zimmerbeutel, Remscheid (DE)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 144 days.

(21) Appl. No.: 15/104,747

(22) PCT Filed: Dec. 12, 2014

(86) PCT No.: PCT/US2014/070017
§ 371 (c)(1),
(2) Date: Jun. 15, 2016

(87) PCT Pub. No.: WO2015/094968
PCT Pub. Date: Jun. 25, 2015

(65) Prior Publication Data
US 2016/0318422 A1    Nov. 3, 2016

Related U.S. Application Data

(60) Provisional application No. 61/916,420, filed on Dec. 16, 2013.

(51) Int. Cl.
*B60N 2/01* (2006.01)
*B60N 2/30* (2006.01)
(Continued)

(52) U.S. Cl.
CPC ............. *B60N 2/01* (2013.01); *B60N 2/06* (2013.01); *B60N 2/20* (2013.01); *B60N 2/30* (2013.01);
(Continued)

(58) Field of Classification Search
None
See application file for complete search history.

(56) References Cited

U.S. PATENT DOCUMENTS 5,826,945 A * 10/1998 Siebler ............... B60N 2/01583
297/452.18
5,927,789 A 7/1999 Mezzadri et al.
(Continued)

FOREIGN PATENT DOCUMENTS

CN  1 747 851 A  3/2006
CN  101 439 686 A  5/2009
(Continued)

OTHER PUBLICATIONS

Chinese Office Action dated Apr. 21, 2017.

*Primary Examiner* — David E Allred
(74) *Attorney, Agent, or Firm* — McGlew and Tuttle, P.C.

(57) ABSTRACT

A seat arrangement, particularly for a vehicle, that includes a second row seat arrangement. The second row seat arrangement includes a first seat, a second seat and a third seat. The first seat can be stored such that direct access to a third row seat arrangement is not limited by the second row seat arrangement. In a two row vehicle, the second row seat arrangement with the first seat stored provides extra space in the second row for placing cargo.

16 Claims, 13 Drawing Sheets

(51) Int. Cl.
   *B60N 2/06* (2006.01)
   *B60N 2/20* (2006.01)
(52) U.S. Cl.
   CPC .......... *B60N 2/3011* (2013.01); *B60N 2/3043* (2013.01)

(56) References Cited

U.S. PATENT DOCUMENTS

| | | | |
|---|---|---|---|
| 6,012,679 A * | 1/2000 | Auestad | B64D 11/0693 244/118.6 |
| 7,490,896 B2 | 2/2009 | Smith | |
| 7,578,536 B2 | 8/2009 | Yajima et al. | |
| 7,762,604 B1 | 7/2010 | Lindsay | |
| 7,980,618 B2 | 7/2011 | Kato et al. | |
| 8,011,713 B2 | 9/2011 | Schlamann | |
| 8,033,604 B2 | 10/2011 | Behrens et al. | |
| 8,118,359 B2 | 2/2012 | Kyogoku et al. | |
| 8,313,146 B2 | 11/2012 | Wagner et al. | |
| 8,393,677 B2 | 3/2013 | Wieclawski | |
| 2005/0012367 A1 * | 1/2005 | Satani | B60N 2/3034 297/232 |
| 2005/0052044 A1 * | 3/2005 | Toyota | B60N 2/3018 296/24.34 |
| 2005/0264077 A1 | 12/2005 | Becker et al. | |
| 2006/0028044 A1 * | 2/2006 | Oishi | B60N 2/01583 296/65.03 |
| 2007/0013204 A1 | 1/2007 | Yajima et al. | |
| 2007/0063557 A1 | 3/2007 | Sawdy | |
| 2007/0132266 A1 | 6/2007 | Ghergheli et al. | |
| 2008/0185893 A1 | 8/2008 | Behrens et al. | |
| 2008/0252121 A1 | 10/2008 | Smith | |
| 2009/0243325 A1 | 10/2009 | Villeminey | |
| 2010/0090510 A1 * | 4/2010 | Kyogoku | B60N 2/3038 297/256.1 |
| 2010/0237673 A1 | 9/2010 | Lindsay | |
| 2011/0062738 A1 | 3/2011 | Lindley et al. | |
| 2011/0187146 A1 | 8/2011 | Lindsay | |
| 2012/0235006 A1 | 9/2012 | Sailer et al. | |
| 2013/0038103 A1 * | 2/2013 | Scott | B64D 11/06 297/248 |

FOREIGN PATENT DOCUMENTS

| | | |
|---|---|---|
| CN | 101 578 199 A | 11/2009 |
| CN | 101 602 331 A | 12/2009 |
| CN | 101 618 687 A | 1/2010 |
| CN | 102 555 858 A | 7/2012 |
| CN | 102 803 013 A | 11/2012 |
| DE | 10 2006 031 886 A1 | 3/2007 |
| DE | 10 2007 005 143 A1 | 8/2008 |
| DE | 10 2007 053 958 A1 | 8/2008 |
| DE | 10 2008 050 301 A1 | 4/2010 |
| DE | 10 2007 005 144 B4 | 12/2010 |
| DE | 10 2009 042 460 A1 | 4/2011 |
| JP | 2001-130304 A | 5/2001 |
| JP | 2003-118439 A | 4/2003 |
| JP | 2009 002 113 A | 1/2009 |
| WO | 2005/044616 A1 | 5/2005 |
| WO | 2008/093197 A1 | 8/2008 |

* cited by examiner

SEAT ARRANGEMENT

CROSS REFERENCE TO RELATED APPLICATIONS

This application is a United States National Phase Application of International Application PCT/US2014/070017 filed Dec. 12, 2014 and claims the benefit of priority of U.S. provisional application 61/916,420 filed Dec. 16, 2013, the entire contents of which are incorporated herein by reference.

FIELD OF THE INVENTION

The invention relates to a seat arrangement, particularly a seat arrangement for a vehicle.

BACKGROUND OF THE INVENTION

Conventional second row seat arrangements do not allow sufficient space to allow convenient and easy ingress to and egress from a third row seat arrangement in a vehicle. Other conventional second row seat arrangements do not provide direct access to a third row seat arrangement. Conventional second row seat arrangements provide an outboard seat that requires work each time a third row seat arrangement is to be accessed since the outboard seat has to be moved and manipulated each time a passenger wishes to access the third row seat arrangement.

DE 10 2006 031 886 A1 discloses a seat arrangement having an additional seat that includes a seat cushion, storable within or under an upholstered seat cushion of one of right and left main seats, and a backrest, storable behind both main seats and below floor level on which the main seats are mounted. When using the additional seat, the seat cushion is taken out from within either main seat and is turned relative to the vehicle length into between seat cushions of the main seats. The backrest is taken out from under the floor level and turned transverse to the vehicle length into between backrests of the main seats.

DE 10 2009 042 460 A1 discloses a vehicle that has a partitioned rear bench with rear bench parts mounted at body-fixed rails. The rails are arranged in an equidistant manner. Each bench part is displaceably provided independent of the other bench part. The rails serve as a common support for the bench parts. A distance of the adjacent rails is adapted to a breadth of a seat part. Another distance of the non-adjacent rails is adapted to a breadth of another seat part. Connecting elements are angularly arranged in a region of one of the rails relative to each other.

U.S. Pat. No. 5,927,789 discloses a seat assembly for a motor vehicle that includes a first row of seats, a second row of seats spaced from the first row of seats, a third row of seats spaced from the second row of seats, and the second row of seats slide laterally to allow ingress and egress to the third row of seats.

WO 2005/044616 A1 discloses a system and method to configure the back seats of a passenger vehicle to provide easy vehicle ingress and egress and to configure the back seats for a flat or near flat load (cargo) floor.

DE 10 2007 005 144 B4 and corresponding U.S. Pat. No. 8,033,604 B2, disclose a vehicle that has a vehicle seat arrangement with a vehicle seat having a backrest and a sitting part. A folding seat has a folding seat-sitting part and a folding seat-backrest, where the folding seat is folded adjacent to the vehicle seat. The part and the backrest are mechanically connected with each other using a screw with an axis of rotation. The folding seat is arranged in a folded condition completely below the sitting part, and the vehicle seat and the folding seat are mechanically connected with each other.

DE 10 2007 053 958 A1 discloses a vehicle seating that has a seat segment with a seat part and another seat segment with another seat part and a backrest. The latter seat segment is stowed under the seat part and the backrest is collapsibly designed. The backrest is hinged on the seat part of the latter segment. The collapsing of the backrest takes place by folding on the seat part. DE 10 2007 053 958 A1 also discloses a method for stowage of a seat segment below another seat segment arranged laterally.

DE 10 2008 050 301 A1 and corresponding U.S. Pat. No. 8,393,677 B2, disclose an automotive seat system that includes a first seat having a back portion and a bottom portion, and a second seat movably attached with the first seat. The second seat moveable between an extended and folded position. One of the back portion and bottom portion of the first seat configured to receive and stow the second seat if in the folded position.

JP 09 002 113 A discloses a storage compartment for a sub seat that is formed under a seat cushion in a main seat, and one end of the seat cushion is pivoted to a seat supporting member to oscillate the seat cushion at a position where the top of the storage compartment is opened and a position where the top of the storage compartment is closed. A main seat side part in a sub seat cushion is pivoted to the seat supporting member, and the sub seat is fitted so as to oscillate between a usable position which permits the seat to be developed to the side of the main seat and a storable position which permits the seat to be stored in the storage compartment.

U.S. Pat. No. 7,490,896 discloses a stowable seat assembly and a method for stowing a vehicular component. The assembly and the vehicular component comprise a stowable seat assembly secured to the vehicle. The assembly has a first seat back and a first seat base, which is adjacent to a longitudinal bar defining in part an opening and a cavity. The assembly also has adjacent to the first seat, a second seat having a second seat base with a bottom side and a second seat back foldable adjacent to the second seat base, and a pivot arm with a first end connected to the second seat base. A second end of the pivot arm is connected to the longitudinal bar, and is positionable on the bar allowing the folded second seat, to pass by the first seat back when pivoted laterally into the opening during stowing of the second seat.

U.S. Pat. No. 7,578,536 discloses a vehicle seat which includes a seat base detachably mounted on a vehicle floor, a seat cushion detachably provided on the seat base, and a backrest foldably supported on the seat base. The seat cushion is detached from the seat base, and the seat cushion and the seat base with the backrest folded are juxtaposed to be stored in a recess provided in the vehicle floor or an area under another seat. In the case of non-use, the vehicle seat can be removed from the vehicle floor to be efficiently stored inside a vehicle.

U.S. Pat. No. 7,980,618 discloses a center seat provided rightward in a left seat that is detached from a center seat retention base when a seatback is caused to fold so that the thickness direction of the seatback coincides with the thickness direction of a seating cushion. Then, the folded center seat is caused to move on a floor forward in the vehicle, and is housed into a center seat-housing portion in a console box.

U.S. Pat. No. 8,011,713 discloses a seat arrangement provided for a motor vehicle with a first vehicle seat and a second vehicle seat that is arranged adjacent to the first vehicle seat in the transverse direction. The vehicle seats include a seat part and a back rest. The first vehicle seat can be displaced in the transverse direction from a first position into a second position in which the first vehicle seat is offset in the direction of the second vehicle seat. The second vehicle seat can furthermore be folded from a service position into an idle position. The seat part of the second vehicle seat is lowered in the idle position such that the seat part of the first vehicle seat is arranged above the seat part of the second vehicle seat in the second position.

U.S. Pat. No. 8,118,359 discloses a vehicle seat that can be configured to include a variety of types of cushions. The seat include primary and secondary cushions that are joined together such that the secondary cushion has a stored position under the seating surface of the primary seat cushion and a deployed position where the secondary seat cushion is positioned adjacent the primary seat cushion. The effective width of the seat may be greater when it is in one position than when it is in the other position. The back cushion may include first and second portions and a third portion intermediate the first and second positions. A vehicle may include left, right, and middle seats, the middle seat being configured to have two positions, the effective width of the middle seat in one position being greater than in the other position.

U.S. Pat. No. 8,313,146 B2 discloses a vehicle seat a center seat in a row of seats. The seat includes a back part swivel connected to a seat part so that the back part and seat part swivel away from each other in a seating position and swivel toward one another in a first stowage position. The seat back may be altered in its longitudinal extent between the first stowage position and a second stowage position such that the seat back has a seat length and a shorter stowage length. The seat further includes a traveling mechanism which automatically moves the back part longitudinally from the seat length to the shorter stowage length when the back part is folded into the first stowage position.

US 2008/0185893 A1 discloses a vehicle seat system, for a motor vehicle, that includes a vehicle seat including a seat back and a seat part. A storage space is accessible by folding away and/or displacing the seat part and is provided below the seat part. The vehicle seat system includes a folding vehicle seat capable of being folded up and situated next to the vehicle seat. In the folded state, when the seat part is folded away and/or displaced, the folding vehicle seat is capable of being, e.g., substantially in its entirety, lowered from above into the storage space and/or folded from above into the storage space.

US 2011/0062738 A1 discloses a vehicle seat comprising at least one first segment with a seat part as well as a second segment with a seat part and a backrest. The second segment can be stowed underneath the seat part while the backrest is collapsible.

US 2012/0235006 A1 discloses a seating system for a motor vehicle that includes three sets of rails mounted to the floor of a motor vehicle. Each set of rails is configured to receive two seats that are capable of sliding in a longitudinal direction on the rails. The motor vehicle also includes storage spaces for storing the seats.

SUMMARY OF THE INVENTION

An object of the present invention is to provide a second row seat arrangement that provides a large cone of entry for ingress and egress to a third row seat arrangement and greater seating arrangement flexibility. The second row seat arrangement includes a first seat that is located at an outboard position, adjacent to a curb-side of a vehicle. The first seat is accessible from a position outside of the vehicle. This allows a passenger to have direct access to the first seat from the position outside the vehicle so that the first seat can be easily manipulated and stored. With the seat in a stored position, a large cone of entry is provided on the curb-side of the vehicle so that a user can directly access a third row seat arrangement. The direct access to the third row seat arrangement allows a passenger to move straight from the curb to the third row seat arrangement. This provides an arrangement in which a passenger does not have to go into a middle area of a vehicle to access the third row seat arrangement. The second row seat arrangement provides direct access to the third row seat arrangement with the first seat in a stored position such that the second row seat arrangement does not limit access to the third row seat arrangement. This allows a passenger to more easily and more comfortably access the third row seat arrangement.

The present invention allows a child seat to be connected to the second row seat arrangement such that the child seat does not affect ingress and egress to the third row seat arrangement since the child seat can be mounted to a seat that is not located adjacent to a curb-side of the vehicle. This further allows direct access to the third row seat arrangement with a larger cone of entry so that a passenger can comfortably enter and exit the third row seat arrangement.

The seating arrangement of the present invention provides increased seating flexibility as different seating configurations are possible. A 20% seat, a 40% seat and another 40% seat are provided. The 20% seat is movable between a deployed position and a stored position. In the deployed position, the 20% seat, the 40% seat and the another 40% seat define a three seat arrangement of a second row arrangement. The 20% seat is arranged adjacent to the curb-side of the vehicle in the three seat arrangement. With the 20% seat in the stored position, it is possible to provide a storage area in the second row seat arrangement that is defined by one or more of the two 40% seats wherein the storage area aligns with another storage area, which is defined by at least one seat of a third seat arrangement with the at least one seat of the third arrangement arranged in a folded position. This provides a five seat arrangement with an extended length storage area. Conventional second row seat arrangements do not allow for a storage area, which is defined by a conventional second row seat arrangement, to align with a storage area that is defined by a third row seat arrangement.

According to the present invention, a seat arrangement comprises a first seat, a second seat and a third seat. The first seat is adjacent to a curb side of a vehicle with the first seat in a deployed position. The first seat is smaller than the second seat and the third seat.

The first seat may be directly accessible from a position outside of the vehicle.

The first seat may be movable from the deployed position to a stored position. A space may be defined adjacent to the curb-side of the vehicle for ingress and egress to a third row seating arrangement with the first seat in the stored position.

The first seat may be stored in the second seat in the stored position.

The first seat may be pivotably connected to the second seat.

The seat arrangement may further comprise a front passenger seat. The first seat may be stored under the front passenger seat in the stored position.

The second seat may be movable in a lateral direction such that the second seat is movable in a direction of the third seat and in a direction away from the third seat.

The second seat may be movable in a forward direction and a rearward direction. The forward direction may be parallel to a traveling direction of the vehicle. The rearward direction may be opposite the traveling direction of the vehicle.

The third seat may be arranged adjacent to the second seat with the first seat in the deployed position to define a three seat arrangement. The first seat may be arranged adjacent to the second seat in the three seat arrangement.

The first seat, the second seat and the third seat may define a second row seat surface in the three seat arrangement. The first seat may define substantially at least twenty percent of the second row seat surface. Each of the second seat and the third seat may define substantially forty percent of the second row seat surface.

According to the present invention, a seat arrangement comprises a first seat, a second seat and a third seat. The first seat is mounted for movement such that the first seat is movable between a deployed position and a stored position. Direct access may be provided to a third row seating arrangement with the first seat in the stored position.

The first seat may be located in an outboard position of a second row seat arrangement with the first seat in the deployed position. The outboard position may be adjacent to a curb-side of a vehicle.

The first seat may comprise a first seat size. The second seat may comprise a second seat size and the third seat may comprise a third seat size. The first seat size may be less than the second seat size and the third seat size. The second seat size may be substantially equal to the third seat size.

The third seat may be arranged adjacent to the second seat with the first seat in the deployed position. The first seat may be arranged adjacent to the second seat in the deployed position. The first seat may be directly accessible from a position outside a vehicle.

The first seat may be pivotably connected to the second seat.

The first seat may be stored in the second seat in the stored position.

The second seat may be mounted for movement such that the second seat is movable in a direction of the third seat and in a direction away from the third seat.

According to the present invention, a seat arrangement comprises a second row seat arrangement. The second row seat arrangement comprises an outboard (first) seat. The outboard seat may be a 20% seat. The outboard seat is stowable such that the second row seat arrangement does not limit access to a third row seating arrangement from a curb-side of a vehicle.

The second row seat arrangement may comprise a second seat and a third seat. The outboard seat may be mounted for movement such that the outboard seat is movable between at least a deployed position and a stowed position. The third seat may be located on one side of the second seat with the outboard seat in the deployed position. The second seat and the third seat may define a two seat configuration with the outboard seat in the stowed position. The second seat, the third seat and the outboard seat may define a three seat configuration with the outboard seat in the deployed position. The outboard seat may be located on another side of the second seat in the deployed position. A size of the outboard seat may be less than a size of the second seat and the third seat.

With the outboard seat in the deployed position, the outboard seat, the second seat and the third seat may define a second row seat surface. The outboard seat may define twenty percent of the second row seat surface. Each of the second seat and the third seat may define substantially forty percent of the second row seat surface.

According to the present invention, a seat arrangement comprises a second row seat arrangement. The second row seat arrangement comprises an outboard seat. The outboard seat is stowable such that a space is defined adjacent to a curb-side of a vehicle for storage of items with the outboard seat in a stored position. Such a seat arrangement allows a user to easily stow items by opening a door adjacent to the outboard seat and placing the items in the space vacated by the outboard seat after the outboard seat is in the stored position. The outboard seat may be a 20% seat, which defines 20% of a seat surface of the second row seat arrangement.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
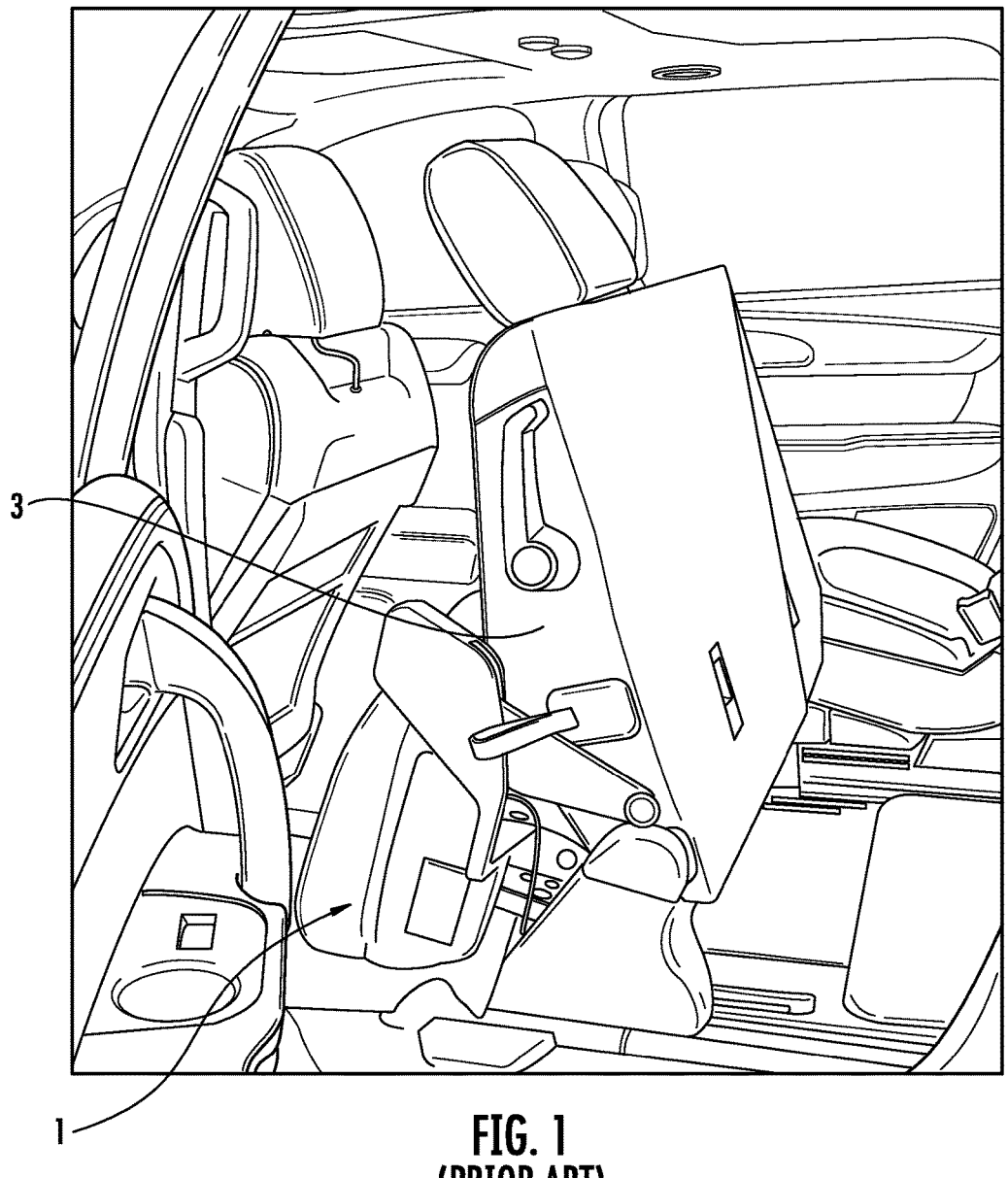
FIG. 1 is a partial perspective view of a conventional second row seat arrangement.

Referring to the drawings in particular, FIG. 1 shows a conventional second row seat arrangement 1 that includes a 60% seat 3 that is movable to allow ingress and egress to a third row seat arrangement.

Figure 2:
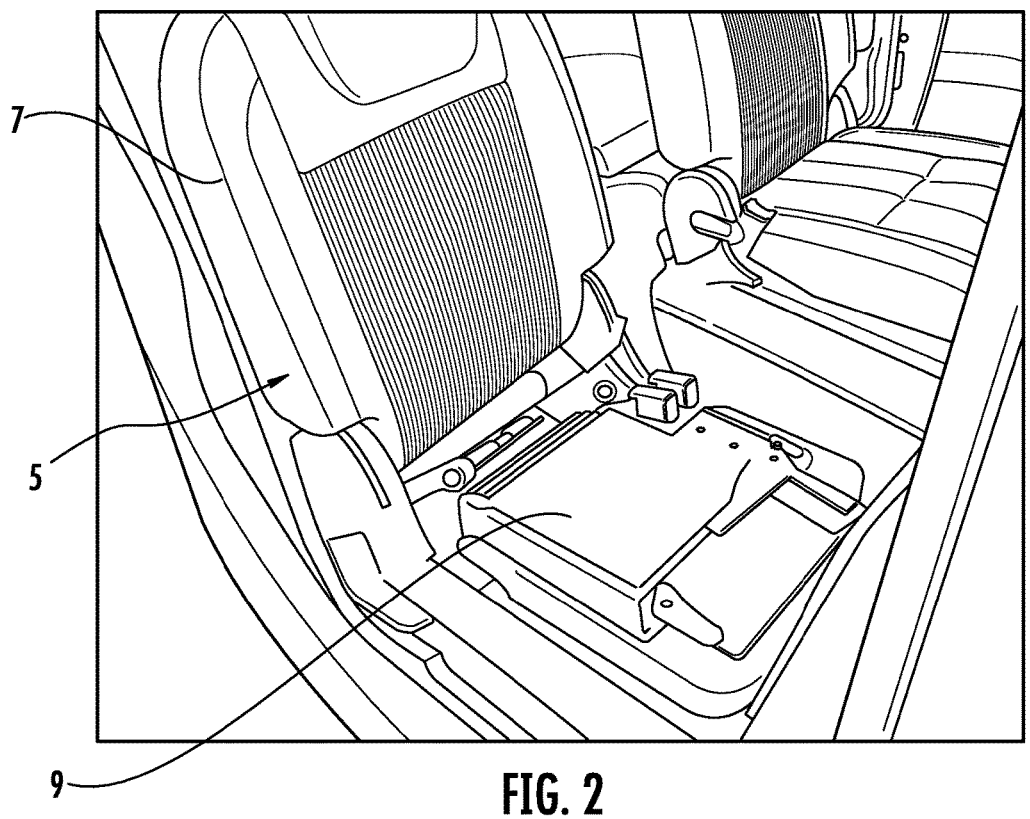
FIG. 2 is a partial perspective view of another conventional second row seat arrangement.

FIG. 2 shows another conventional second row seat arrangement 5 that includes a seat 7 and a center 20% seat 9 that can be stored in the seat 7.

Figure 3:
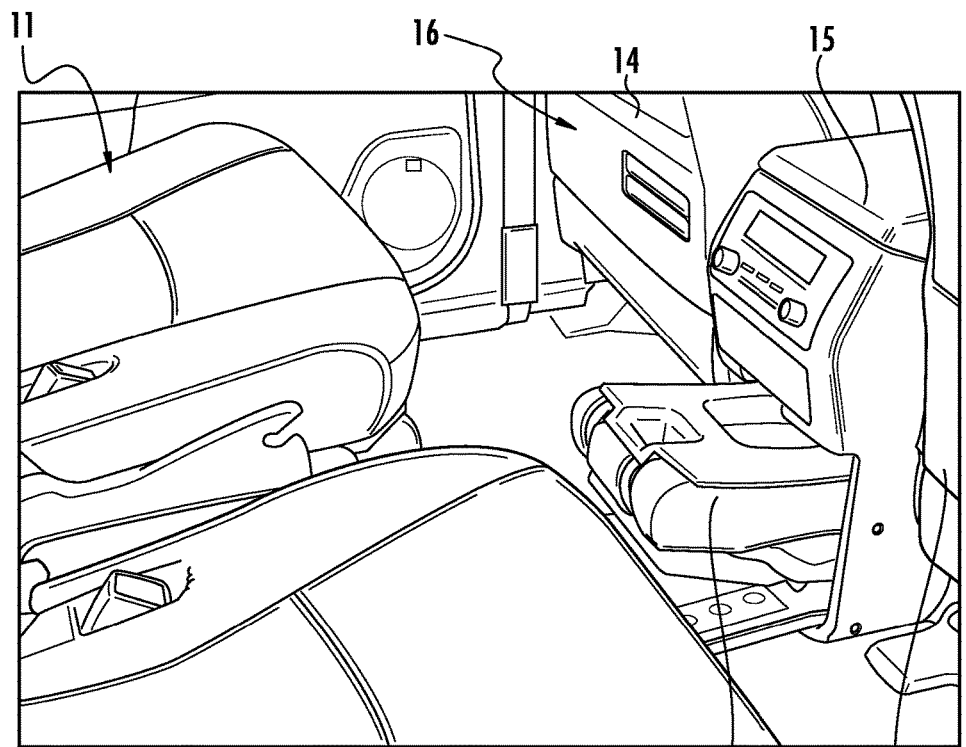
FIG. 3 is a partial perspective view of yet another conventional second row seat arrangement.

FIG. 3 shows yet another conventional second row seat arrangement 11 that includes a center 20% seat 13 that can be stored in or under a center console 15, which is arranged between a seat 12 and a seat 14 of a first row seat arrangement 16.

Figure 4:
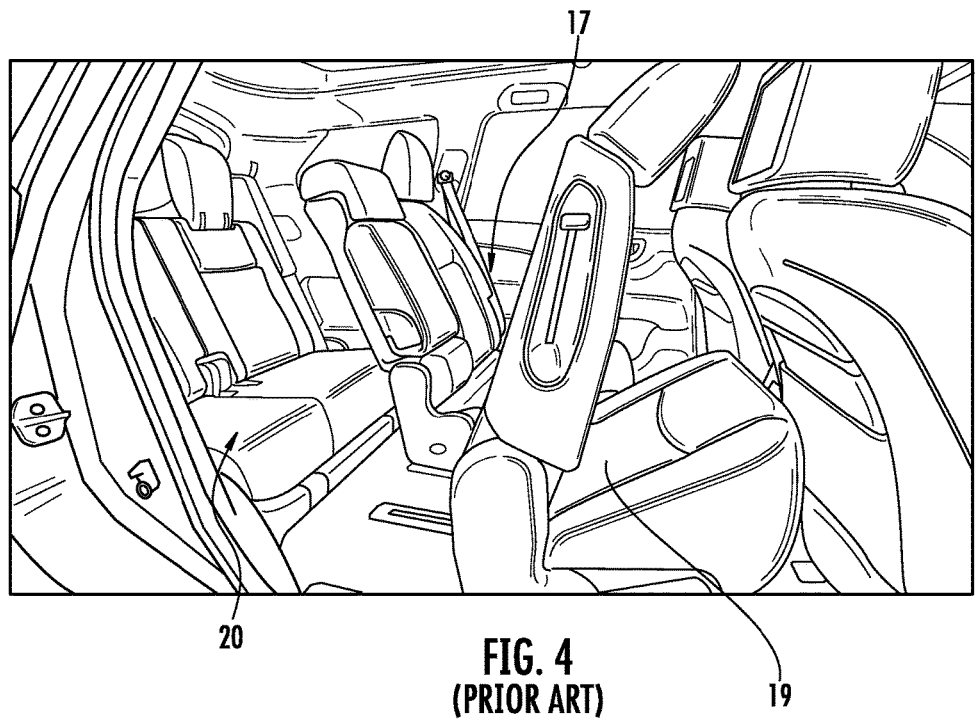
FIG. 4 is a partial perspective view of yet another conventional second row seat arrangement.

FIG. 4 shows yet another conventional second row seat arrangement 17 that includes a seat 19 that is movable to allow ingress and egress to a third row seat arrangement 20.

Figure 5:
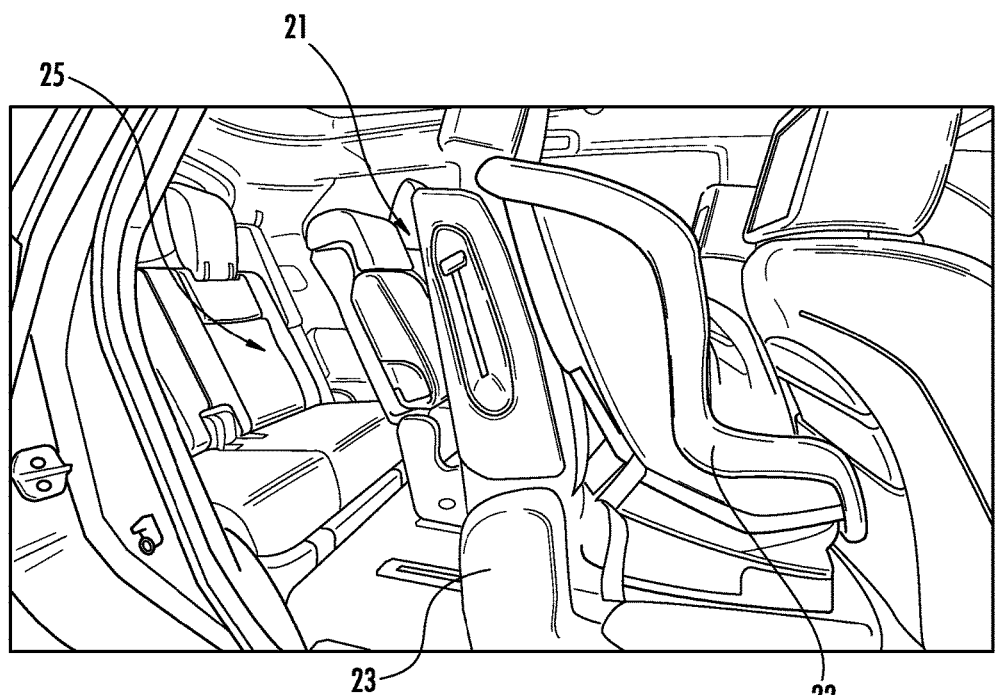
FIG. 5 is a partial perspective view of yet another conventional second row seat arrangement.

FIG. 5 shows yet another conventional second row seat arrangement 21 that includes a seat 23 with a child seat 22 that is movable to allow ingress and egress to a third row arrangement 25.

The conventional second row seat arrangements shown in FIGS. 1-5 do not provide sufficient space to allow direct ingress and egress to a third row seat arrangement. Further, the conventional second row arrangements shown in FIGS. 1, 4 and 5 require work to move the seat 3, 19 and 23 every time a passenger wishes to gain access to a third row seat arrangement. The conventional second row seat arrangements shown in FIGS. 2 and 3 do not provide direct access to a third row seat arrangement from a curb-side of a vehicle since a passenger must climb into the vehicle in order to access the third row seat arrangement.

Figure 6:
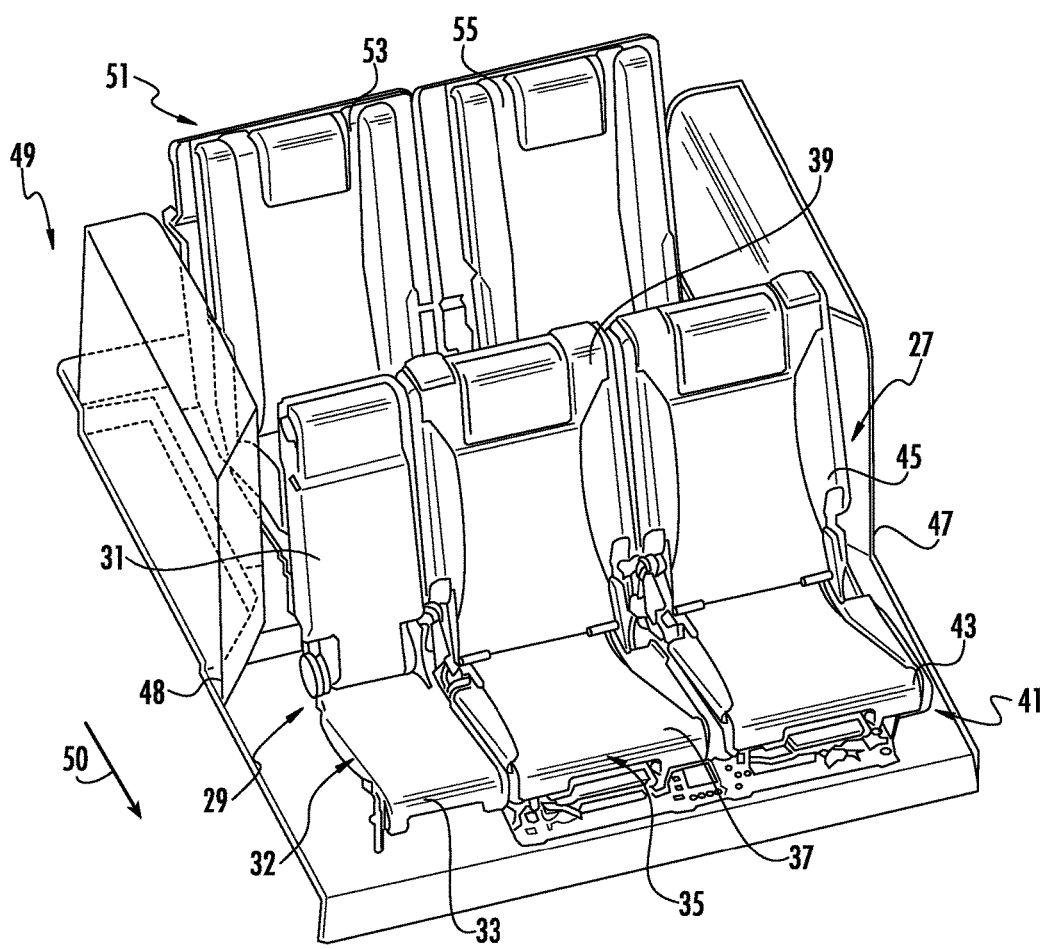
FIG. 6 is a perspective view of a seating arrangement of the present invention with all of the seats of the second row seating arrangement in a deployed position.

FIG. 6 is a perspective view of a second row seat arrangement 27 of the present invention. The second row arrangement 27 includes a first seat 29 that is located adjacent to a curb side 34 of a vehicle 49 with the first seat 29 in a deployed position. This provides direct access to the first seat 29 from a position outside of the vehicle 49 so that a passenger can directly access the first seat 29. This allows a passenger to directly access and manipulate the first seat 29 into a stored position from a position outside of the vehicle 49. With the first seat 29 in the stored position, a large cone of entry is provided so that a passenger can easily access a third row seat arrangement (see FIG. 8). This provides easier ingress and egress to the third row seat arrangement so that passengers can more comfortably enter and exit the third row seat arrangement of the vehicle from the curb side since passengers can simply go straight to the third row seat arrangement without having to go into the middle of the vehicle to access the third row seat arrangement as featured in the conventional second row seat arrangements shown in FIGS. 2 and 3. Further, the first seat 29 may remain in the stored position until a need arises to deploy the first seat 29. This provides less work for a passenger since it is not necessary to move the first seat 29 each time a passenger desires to access the third row seat arrangement.

The second row arrangement 27 includes a second seat 35 and a third seat 41 in addition to the first seat 29. The first seat 29 is smaller than the second seat 35 and the third seat 41. The first seat 29 is arranged adjacent to the curb-side 34 of the vehicle 49 with the first seat 29 in the deployed position. The first seat 29 is located on one side of the second seat 35 and the third seat 41 is located on another side of the second seat 35 with the first seat 29 in the deployed position. With the first seat 29 in the deployed position, the first seat 29, the second seat 35 and the third seat 41 define a second row seat arrangement surface 32. The first seat 29 is a 20% seat, which means that the first seat 29 defines approximately 20% of the seating surface 32 of the second row seat arrangement 27. The second seat 35 is a 40% seat and the third seat 41 is a 40% seat, which means that the second seat 35 defines approximately 40% of the seating surface 32 of the second row seat arrangement 27 and the third seat 41 defines approximately 40% of the seating surface 32 of the second row seat arrangement 27.

The first seat 29 includes a backrest structure 31 for engaging at least a lumbar region of a passenger. The first seat 29 has a cushion 33 for engaging at least a passenger's buttock and a portion of a passenger's legs. The second row seat arrangement 27 includes a second seat 35, which includes a backrest structure 39 for engaging at least a lumbar region of a passenger. The second seat 35 has a cushion 37 for engaging at least a passenger's buttock and a portion of a passenger's legs. The second row seat arrangement 27 includes a third seat 41. The third seat 41 has a backrest structure 45 for engaging at least a lumbar region of a passenger. The third seat 41 has a cushion 43 for engaging at least a passenger's buttock and a portion of a passenger's legs. The cushions 33, 37 and 43 comprise foamed occupant support for supporting a passenger. The second row seat arrangement is arranged in a vehicle 49. A seatbelt for the first seat 29 may be arranged in a pillar of the vehicle 49.

A third row seat arrangement 51 is located at a position rearward of the second row seat arrangement 27 with respect to a traveling direction 50 of the vehicle 49. The third row seat arrangement 51 includes a first third row seat 53 and a second third row seat 55. It is possible that the third row seat arrangement 51 may include more than two seats, such as a three seat third row arrangement. The vehicle 49 includes a first door 48, which provides an opening for ingress and egress when the first door 48 is opened, and a second door 47, which provides an opening for ingress and egress when the second door 47 is opened. The first seat 29 is arranged adjacent to the first door 48 when the first seat 29 is in a deployed position and the first door is in a closed position. The third seat 41 is arranged adjacent to the second door 47 when the second door 47 is in a closed position. In another embodiment (not shown), the first seat 29 may be arranged adjacent to the second door 47 when the first seat 29 is in a deployed position and the second door 47 is in a closed position and the third seat 41 is arranged adjacent to the first door 48 when the first door 48 is in the closed position.

Figure 7:
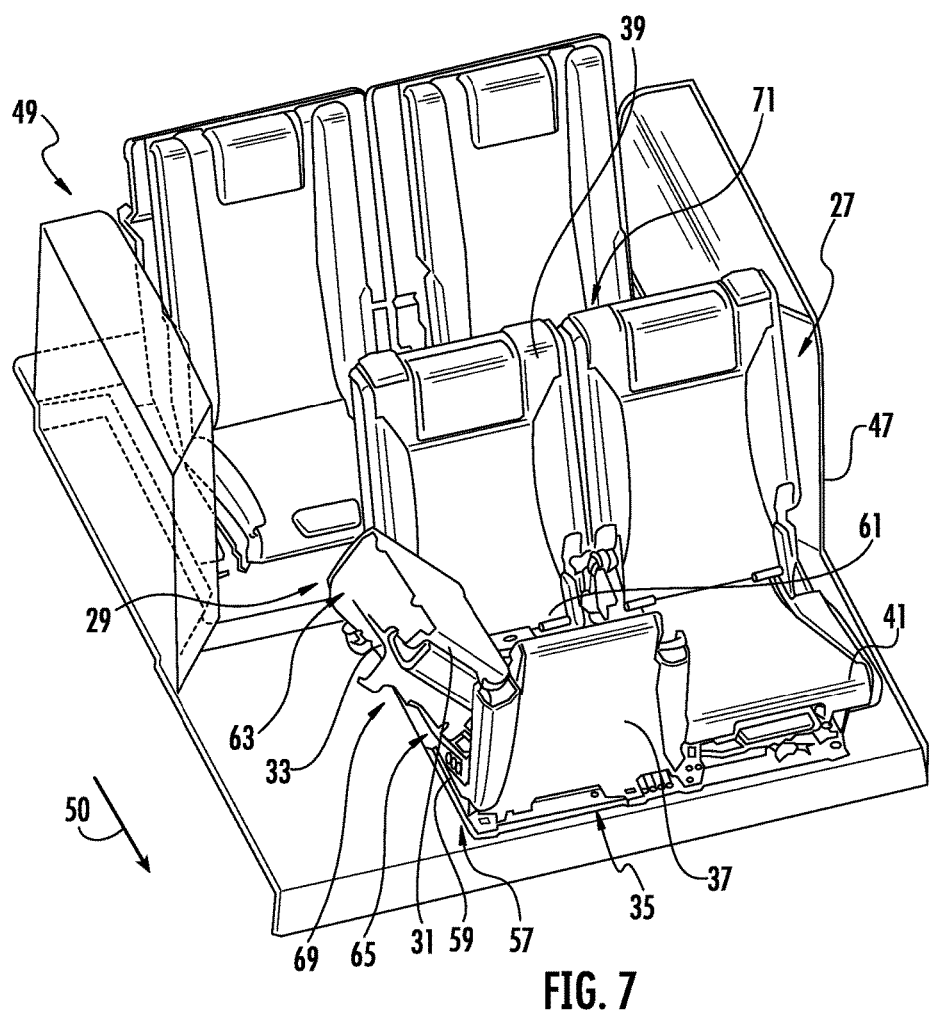
FIG. 7 is another perspective view of the seating arrangement of FIG. 6 showing a first seat of the second row seating arrangement being moved into a recess of a second seat of the second row seating arrangement.

FIG. 7 is a perspective view showing the cushion 37 of the second seat 35 pivotably connected to a frame structure 59 of the second seat 35 via a pivotable connection 57 such that the cushion 37 of the second seat 35 is movable between a closed position and an open position. The cushion 37 moves in a direction of a first row seat arrangement and away from backrest structure 39 when the cushion 37 moves from the closed position to the open position. The second seat 35 includes a recess 61. The backrest structure 31 of the first seat 29 is pivotably connected to the cushion 33 via a pivotable connection 63 such that the backrest structure 31 is movable from a first position, in which the backrest structure 31 supports at least a lumbar region of a passenger (see FIG. 6), to a folded position to form a folded configuration 69 of the first seat 29. In the folded position, the backrest structure 31 is substantially parallel to the cushion 33 with the backrest structure 31 and the cushion 33 being in a horizontal position. The cushion 33 is pivotably connected to the frame structure 59 via a pivotable connection 65 such that the folded configuration 69 of the first seat 29 is movable from a position adjacent to the second seat (unstored position), which is located outside the recess 61, to a stored position. In the position adjacent to the second seat (unstored position), the backrest structure 31 is arranged above the cushion 33. With the cushion 37 in the open position, the folded configuration 69 of the first seat 29 is moved from the position adjacent to the second seat (unstored position), in a direction 67 of the second door 47, to the stored position. The direction 67 is perpendicular to the traveling direction 50 of the vehicle 49. In the stored position, the first seat 29 in the folded configuration 69 is arranged in the recess 61 such that the cushion 33 is located above the backrest structure 31. The cushion 37 of the second seat 35 is moved from the open position in a downward direction, away from a first row seat arrangement of the vehicle 49, to the closed position after the first seat 29 is stored in the recess 61 of the second seat 35 to form a two seat arrangement in a first two seat configuration 71. The two seat arrangement includes the second seat 35 and the third seat 41.

Figure 8:
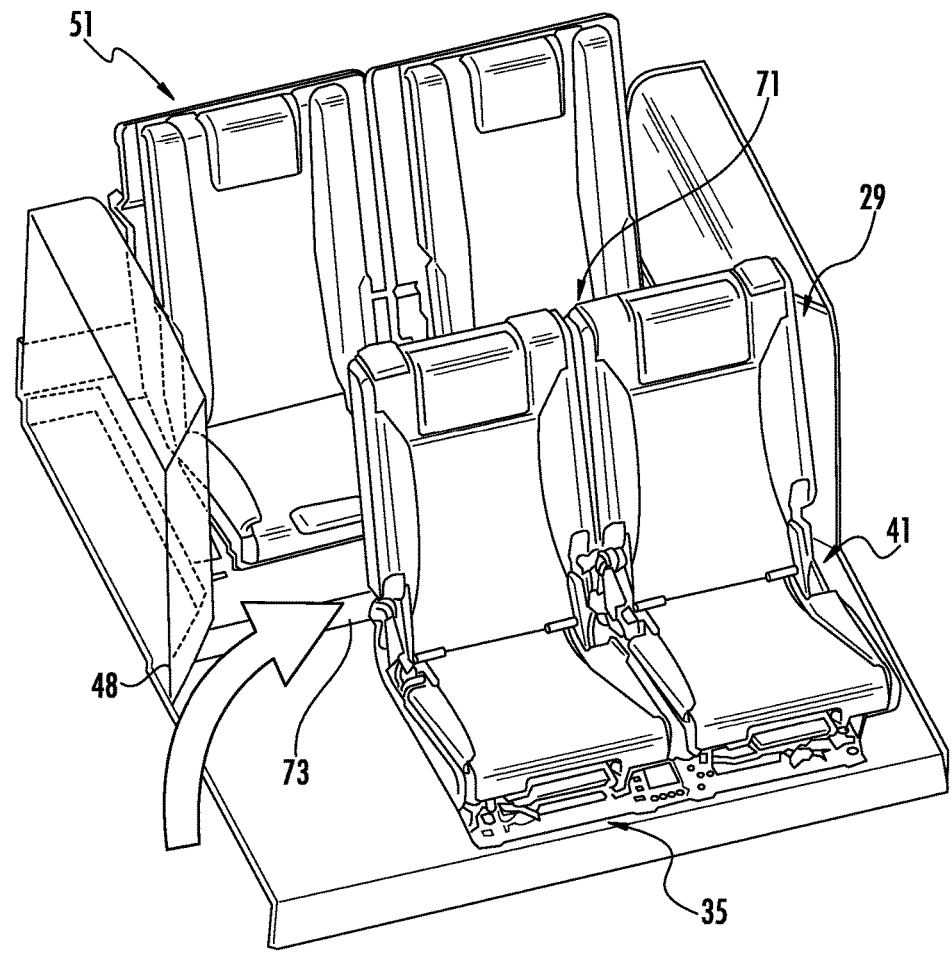
FIG. 8 is a perspective view of the seating arrangement of FIG. 7 with the first seat of the second row seating arrangement stored in the second seat of the second row arrangement to provide a two seat arrangement.

In another embodiment (not shown), instead of the first seat 29 being stored in the second seat 35 as shown in FIG. 8, the first seat 29 may be stored in a position under a front seat of a first (front) row seating arrangement (not shown). The front seat may comprise a space for receiving the first seat 29 wherein the first seat 29 is arranged in the space defined at least by the front seat in the stored position. In another embodiment, the space in which the first seat 29 is stored may be exclusively defined by the floor of the vehicle 49.

FIG. 8 shows the two seat arrangement of the second row seat arrangement in the first two seat configuration 71 with the first seat 29 stored in the second seat 35 or with the first seat 29 stored under the front seat of the first row seating arrangement. The second row seat arrangement in the first two seat configuration 71 with the first seat 29 stored in the stored position provides a space 73 located at least between the first door 48 and the second seat 35. When the first door 48 is in the open position, a passenger is able to gain direct access for ingress and egress to the third row seat arrangement 51 via the space 73 when the first door 48 is in the open position. This allows a passenger to directly enter and exit the third row seat arrangement 51 without the second row seat arrangement limiting a passenger's access to the third row seat arrangement 51. A passenger is able to move directly from the curb to the third row seat arrangement 51 as a result of the large cone of entry provided by the space 73.

Figure 9:
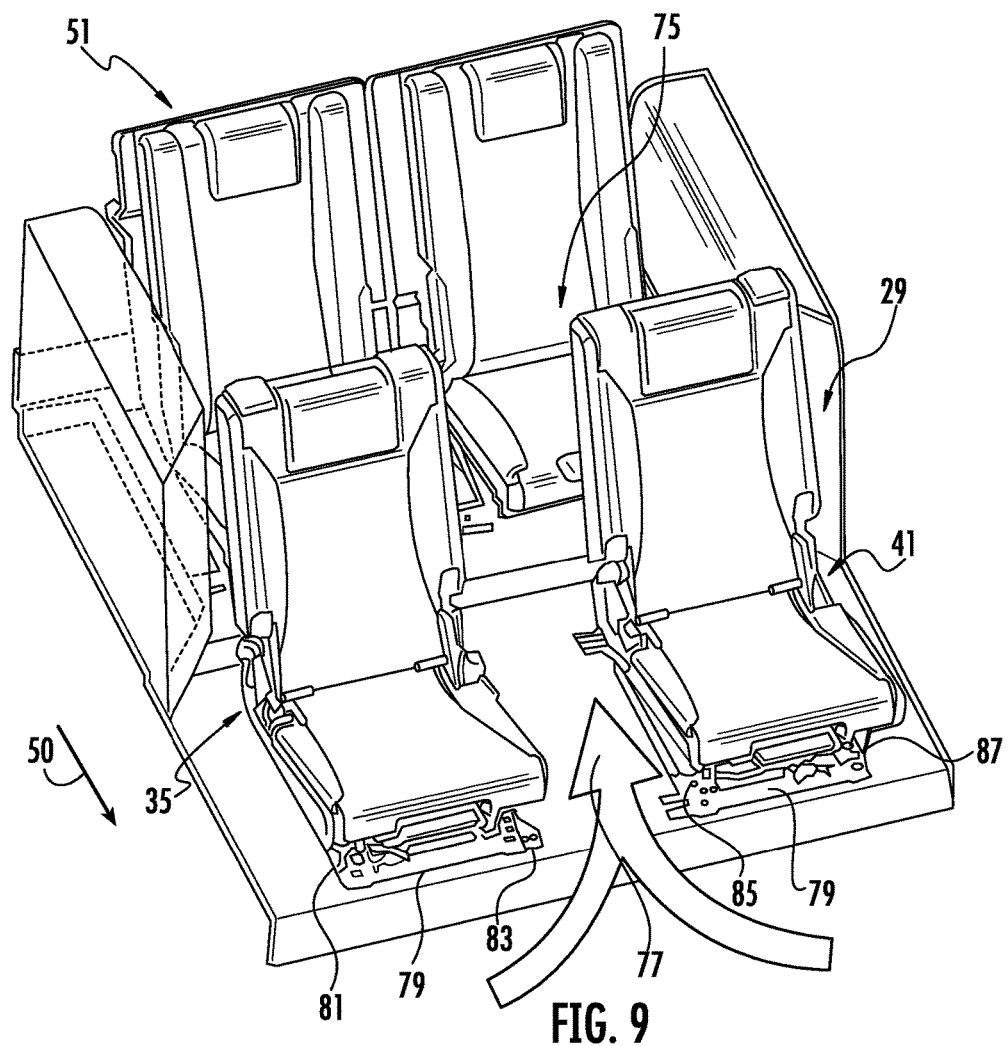
FIG. 9 is a perspective view of the seating arrangement of FIG. 8 showing the second seat of the second row seating arrangement located at a spaced location from a third seat of the second row seating arrangement with the first seat stored in the second seat.

FIG. 9 shows the two seat arrangement of FIG. 8 in a second two seat configuration 75 in which the second seat 35 is moved laterally in a direction away from the third seat 41. In the second two seat configuration 75, the second seat 35 is located at a spaced location from the third seat 41 wherein a space 77 is defined between the second seat 35 and the third seat 41. This allows a passenger to easily gain access to the third row seat arrangement 51 through the space 77. The second seat 35 is movably connected to one or more rail elements 79 such that the second seat 35 is movable laterally in a direction of the third seat 41 and in a direction away from the third seat 41. The one or more rail elements 79 extend in a direction that is perpendicular to the traveling direction 50 of the vehicle. The third seat 41 may also be movably connected to the one or more rail elements 79 such that the third seat 41 is movable in a direction of the second seat 35 and in a direction away from the second seat 35. The second seat 35 is connected to a rail 81 and a rail 83 such that the second seat 35 is movable in a forward direction, which is parallel to the traveling direction 50 of the vehicle 49, towards the first row seat arrangement of the vehicle 49 and in a rearward direction, away from the first row seat arrangement and in a direction opposite the traveling direction 50 of the vehicle 49. The third seat 41 is connected to a rail 85 and a rail 87 such that the third seat 41 is movable in a forward direction, which is parallel to the traveling direction 50 of the vehicle 49, towards the first row seat arrangement and in a rearward direction, away from the first row seat arrangement of the vehicle 49 and in a direction opposite the traveling direction 50 of the vehicle 49.

Figure 10:
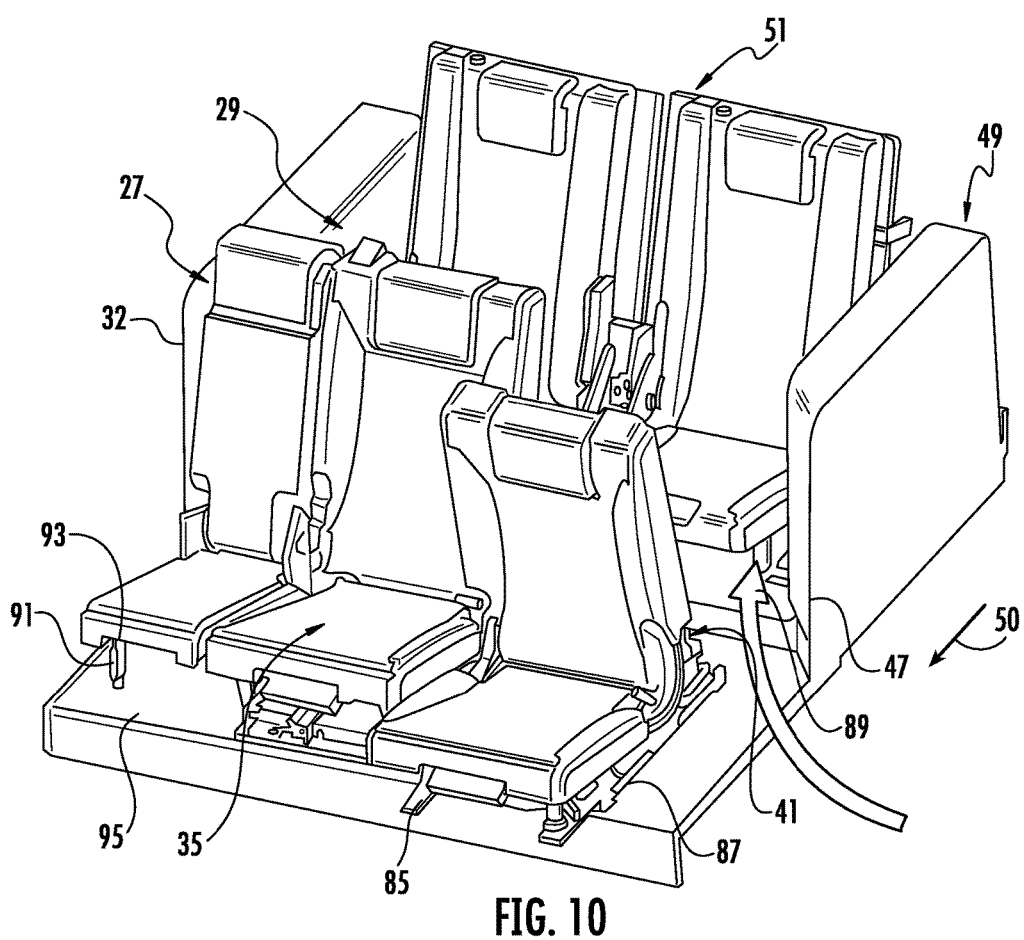
FIG. 10 is a perspective view of the seating arrangement of FIG. 6 with a third seat of the second row seat arrangement moved in a direction away from a third row seat arrangement.

FIG. 10 shows the second seat arrangement 27 with the second seat 35, the third seat 41 and with the first seat 29 in a deployed position to provide a three seat arrangement. The first seat 29 may include a leg 91 that is pivotably connected to the first seat 29 via a pivotable connection 93 such that the leg is movable between a folded leg position and a deployed leg position. The leg 91 engages a floor 95 of the vehicle 29 with the leg 91 in the deployed position and with the first seat 29 in the deployed position. In another embodiment of the first seat 29, there may be no leg and the first seat 29 may be connected to second seat 35 via a cantilevered connection. The second seat arrangement 27 is able to seat at least three passengers with the first seat 29 in the deployed position. The third seat 41 is located opposite the curb-side 32 of the vehicle 49 with the first seat 29 in the deployed position. The third seat 41 is movable in a forward direction, toward a first row seat arrangement and in a direction away from the third row seat arrangement 51 and in a direction parallel to the traveling direction 50 of the vehicle 49, to provide a space 89. Ingress and egress to the third row seat arrangement 51 is allowed via the space 89 when the second door 47 is in the open position. This allows passengers to enter and exit the vehicle 49 on a side of the vehicle 49 that is opposite the curb-side 32 of the vehicle 49.

Figure 11:
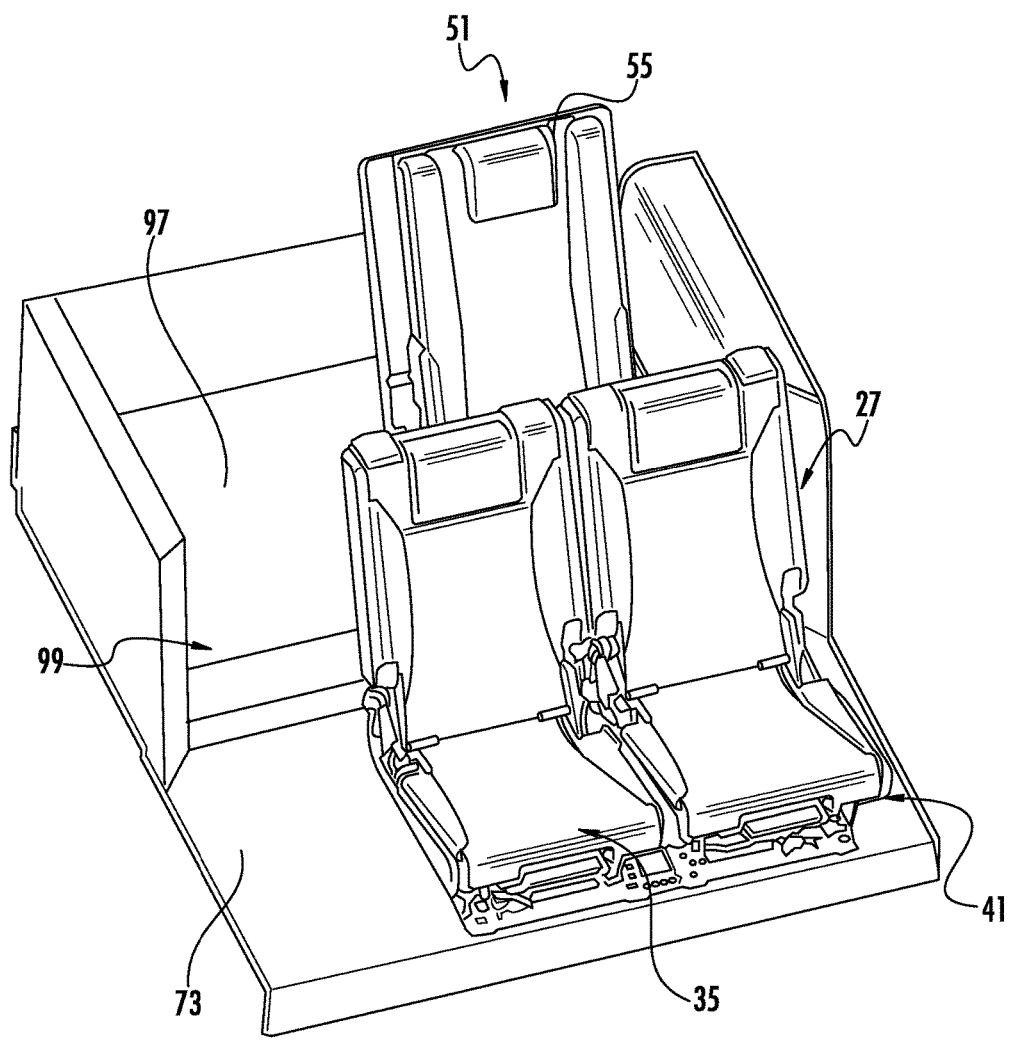
FIG. 11 is a perspective view of the seating arrangement of FIG. 8 with the first seat of the second row arrangement stored in the second seat of the second row arrangement and a seat of a third row arrangement in a stored position.

FIG. 11 shows the first seat 29 in the stored position, which provides the space 73 in the second row seat arrangement 27. The first third row seat 53 is in a stored position to form a space 97 in the third row seat arrangement 51. The space 97 is aligned with the space 73 to form a storage area 99 for cargo.

Figure 12:
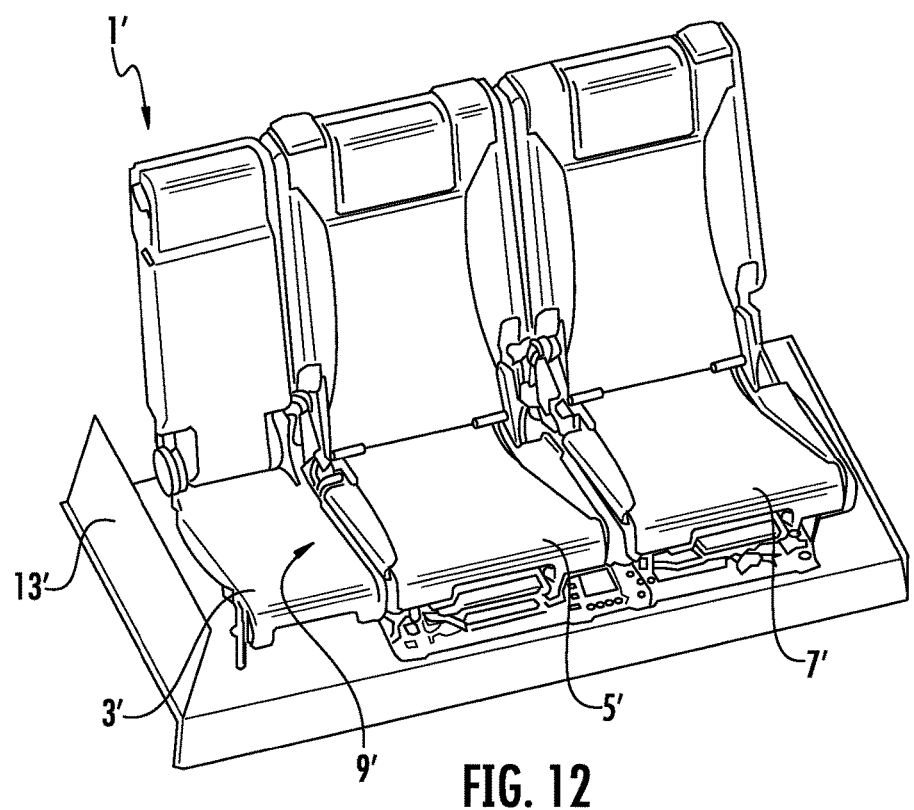
FIG. 12 is a perspective view of another embodiment of a seat arrangement with a first seat in a deployed position.
Figure 13:
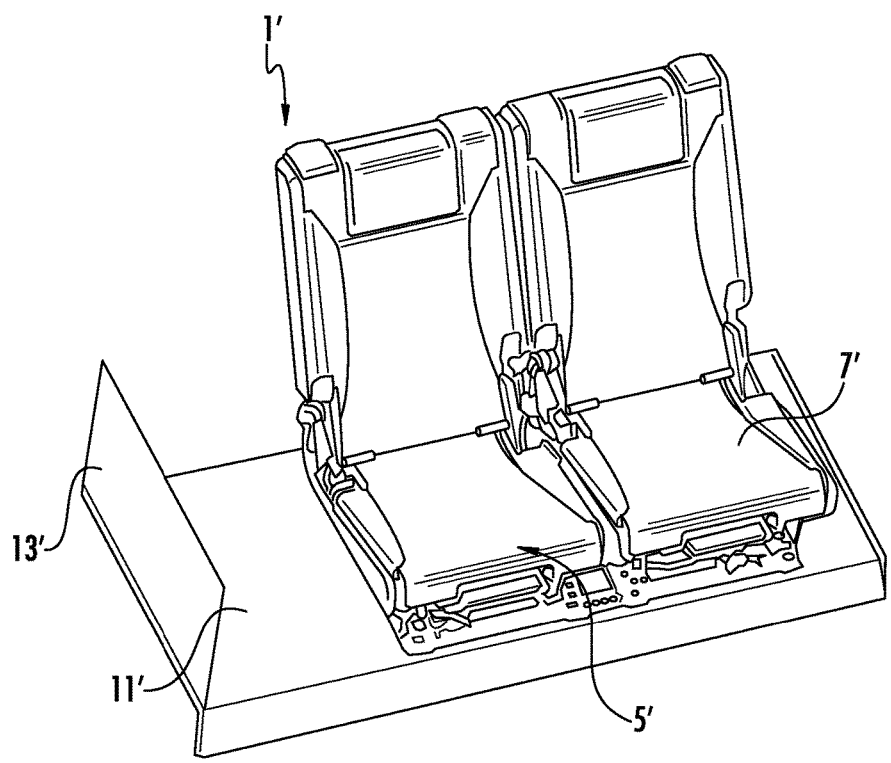
FIG. 13 is a perspective view of the seating arrangement of the seat arrangement of FIG. 12 with the first seat in a stored position.

FIG. 12 shows a vehicle seat arrangement 1'. The vehicle seat arrangement 1' may be provided in a first row of a vehicle or a second row of a vehicle. The vehicle seat arrangement 1' includes a first seat 3', a second seat 5' and a third seat 7'. The first seat 3' is arranged adjacent to a vehicle door 13'. The first seat 3', the second seat 5' and the third seat 7' define a seating surface 9'. The first seat 3' may be a 20% seat, which defines twenty percent of the seating surface 9'. The second seat 5' may be a 40% seat and the third seat 7' may be a 40% seat, which means that each of the second seat 5' and the third seat 7' define 40% of the seating surface 9'. The first seat 3' is pivotably connected to the second seat 5' such that the first seat 3' is movable between a deployed position as shown in FIG. 12 and a stored position as shown in FIG. 13. In another embodiment, it is possible to store the first seat 3' in an area other than the second seat 5', such as in a space provided below a seat in front of the first seat 3'.

FIG. 13 shows the first seat 3' in the stored position to define a space 11'. This allows a user to place cargo in the space 11' or stow items in the space 11'. This allows the user to easily stow items with the first seat 3' in the stored position by opening the vehicle door 13' and placing items or cargo in the space 11'.

While specific embodiments of the invention have been shown and described in detail to illustrate the application of the principles of the invention, it will be understood that the invention may be embodied otherwise without departing from such principles.

What is claimed is:

1. A seat arrangement, comprising:
   a first seat adjacent to a curb side of a vehicle with said first seat movable from a deployed position to a stored position;
   a second seat;
   a third seat, said first seat being smaller than each of said second seat and said third seat;
   wherein said first seat is stored in said second seat in said stored position.

2. A seat arrangement in accordance with claim 1, wherein said first seat is directly accessible from a position outside of the vehicle.

3. A seat arrangement in accordance with claim 1, wherein a space is defined adjacent to the curb-side of the vehicle for ingress and egress to a third row seating arrangement with said first seat in said stored position.

4. A seat arrangement in accordance with claim 3, wherein said first seat is pivotably connected to said second seat.

5. A seat arrangement in accordance with claim 1, wherein said second seat is movable in a lateral direction such that said second seat is movable in a direction of said third seat and in a direction away from said third seat.

6. A seat arrangement in accordance with claim 1, wherein said second seat is movable in a forward direction and a rearward direction, said forward direction being parallel to a traveling direction of the vehicle, said rearward direction being opposite the traveling direction of the vehicle.

7. A seat arrangement in accordance with claim 1, wherein said third seat is arranged adjacent to said second seat with said first seat in said deployed position to define a three seat arrangement, said first seat being arranged adjacent to said second seat in said three seat arrangement.

8. A seat arrangement in accordance with claim 7, wherein said first seat, said second seat and said third seat define a second row seat surface in said three seat arrangement, said first seat defining at least twenty percent of said second row seat surface.

9. A seat arrangement, comprising:
   a first seat;
   a second seat;
   a third seat, said first seat being mounted for movement such that said first seat is movable between a deployed position and a stored position within the second seat, wherein direct access is provided to a third row seating arrangement with said first seat in said stored position;
   wherein said first seat is located in an outboard position of a second row seat arrangement with said first seat in said deployed position, said outboard position being adjacent to a curb-side of a vehicle; and
   wherein said first seat comprises a first seat size, said second seat comprises a second seat size and said third seat comprises a third seat size, said first seat size being less than said second seat size and said third seat size.

10. A seat arrangement in accordance with claim 9, wherein said third seat is arranged adjacent to said second seat with said first seat in said deployed position, said first seat being arranged adjacent to said second seat in said deployed position, wherein said first seat is directly accessible from a position outside a vehicle.

11. A seat arrangement in accordance with claim 9, wherein said first seat is pivotably connected to said second seat.

12. A seat arrangement in accordance with claim 9, wherein said first seat is stored in said second seat in said stored position.

13. A seat arrangement in accordance with claim 9, wherein said second seat is mounted for movement such that said second seat is movable in a direction of said third seat and in a direction away from said third seat.

14. A seat arrangement in accordance with claim 9, wherein said second seat is movable in a forward direction and in a rearward direction, said forward direction being parallel to a traveling direction of a vehicle, said rearward direction being opposite the traveling direction of the vehicle.

15. A seat arrangement in accordance with claim 9, wherein said first seat is an outboard seat, wherein said outboard seat is stowable such that a second row seat arrangement does not limit access to said third row seating arrangement from a curb-side of a vehicle with said outboard seat in said stored position.

16. A seat arrangement in accordance with claim 15, wherein said second row seat arrangement comprises said second seat and said third seat, said third seat being located on one side of said second seat with said outboard seat in said deployed position, said second seat and said third seat defining a two seat configuration with said outboard seat in said stored position, said second seat, said third seat and said outboard seat defining a three seat configuration with said outboard seat in said deployed position, said outboard seat being located on another side of said second seat in said deployed position.

* * * * *